(12) United States Patent
Cook et al.

(10) Patent No.: US 7,375,343 B1
(45) Date of Patent: May 20, 2008

(54) AlMGB$_{14}$ AND RELATED ICOSAHEDRAL BORIDE SEMICONDUCTING MATERIALS FOR NEUTRON SENSING APPLICATIONS

(75) Inventors: Bruce A. Cook, Ankeny, IA (US); John Evan Snyder, Penarth (GB); Alan P. Constant, Ames, IA (US); Yun Tian, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 149 days.

(21) Appl. No.: 11/422,629

(22) Filed: Jun. 7, 2006

Related U.S. Application Data

(60) Provisional application No. 60/689,849, filed on Jun. 13, 2005.

(51) Int. Cl.
*G01T 3/08* (2006.01)
(52) U.S. Cl. .................................. 250/390.01
(58) Field of Classification Search ........... 250/370.05, 250/390.01
See application file for complete search history.

(56) References Cited

U.S. PATENT DOCUMENTS

| 6,099,605 | A | 8/2000 | Cook et al. |
| 6,432,855 | B1 | 8/2002 | Cook et al. |
| 6,771,730 | B1 | 8/2004 | Dowben et al. |

OTHER PUBLICATIONS

Y. Tian et al., "Electrical transport in amosphous semiconducting AlMgB14 films." Applied Physics Letters,vol. 85, No. 7 (Aug. 16, 2004) pp. 1181-1183.*

Adenwalla et al., "Boron carbide/n-silicon carbide heterojunction diodes", Applied Physics Letters, vol. 79 (26):4357-4358 (2001).

Cherukuri et al., "Lathe turning of titanium using pulsed laser deposited, ultra-hard boride coatings of carbide inserts", Machining Science and Technology, vol. 7(1):119-135 (2003).

Cook et al., A new class of ultra-hard materials based on AIMgB14, Scripta mater, 42(2000) 597-602, Elsevier Science Ltd.

Kumashiro et al., "Thermal neutron irradiation experiments on 10BP single-crystal wafers", J. of the Less-Common Metals 143:71-75 (1988).

Lee, Sunwoo et al., "Characterization of boron carbide thin films fabricated by plasma enhanced chemical vapor deposition from boranes", J. Appl. Phys. 72(10):4925-4933 (1992).

Lewis et al., "Al2MgO4, Fe3O4, and FeB impurities in AIMgB14", Materials Science and Engineering A00 (2003) 1-6, Elsevier Science B.V.

Lund, et al., "Boron phosphide on silicon for radiation detectors", Mat. Res. Soc. Symp. Proc. vol. 162:601-604 (1990).

(Continued)

*Primary Examiner*—Constantine Hannaher
(74) *Attorney, Agent, or Firm*—McKee, Voorhees & Sease, P.L.C.

(57) ABSTRACT

A neutron detecting and method of use for a semiconducting material having a formula of M1M2B$_{14}$ where M1 is aluminum, magnesium, silver, sodium or scandium and M2 is boron, chromium, erbium, holmium, lithium, magnesium, thulium, titanium, yttrium, or gadolinium.

11 Claims, 3 Drawing Sheets

OTHER PUBLICATIONS

McGregor et al., "Semi-insulating bulk GaAs thermal neutron imaging arrays", IEEE Transactions on Nuclear Science, vol. 43(3):1357-1364 (1996).

Robertson et al., "A class of boron-rich solid-state neutron detectors", Applied Physics Letters, vol. 80(19) 3644-3646 (2002).

Russell et al., "Coefficient of thermal expansion of AlMgB14", Scripta Materialia 46:629-633 (2002), Elsevier Science Ltd.

Tian et al., Superhard self-lubricating AlMgB14 "films for microelectromechanical devices", Applied Physics Letters, vol. 83(14) 1-3 (2003).

Tian et al., "Microstructure evolution of Al-Mg-B thin films by thermal annealing", J. Vac. Sci. Technol. A. vol. 21 (4):1055-1063 (2003).

Day, E.; Diaz, M.J.; Adenwalla, S., "Effect of bias on neutron detection in thin semiconducting boron carbide films", J. of Physics D: Applied Physics, 39(14):2920-2924 (2006).

McGregor, D.S.; Hammig, M.D.; Yang, Y.-H.; Gersch, H.K.; Klann, R.T., "Design considerations for thin film coated semiconductor thermal neutron detectors -I: Basics regarding alpha particle emitting neutron reactive films. Nuclear Instruments & Methods in Physics Research, Section A: Accelerators, Spectrometers, Detectors, and Associated Equipment", 500 (1-3):272-308 (2003).

* cited by examiner

AlMGB$_{14}$ AND RELATED ICOSAHEDRAL BORIDE SEMICONDUCTING MATERIALS FOR NEUTRON SENSING APPLICATIONS

CROSS-REFERENCE TO RELATED APPLICATIONS

This application claims priority under 35 U.S.C. § 119 of a provisional application Ser. No. 60/689,849 filed Jun. 13, 2005, which application is hereby incorporated by reference in its entirety.

GRANT REFERENCE

This invention was partially funded by DOE Contract No. W-7405-Eng-82. The government may have certain rights in the invention.

BACKGROUND OF THE INVENTION

This invention relates to neutron detecting. Specifically, this invention relates to icosahedral boride semiconducting materials for neutron detection applications and methods of use.

The neutron is a sub-atomic particle which has mass, but no electrical charge. Since neutrons have no electrical charge, they cannot directly produce ionization in detectors. Therefore, neutrons cannot be directly detected. In other words, neutrons are difficult to detect, because they are not charged and thus do not interact electrically with most matter as electrons or protons do. As a result, neutron detectors must rely upon a conversion process upon which the presence of neutrons is deduced. In the conversion process, an incident neutron interacts with a nucleus to produce a secondary charged particle. The resulting charged particles can then be directly detected.

Neutrons are produced by fission of nuclear materials or by naturally-occurring radioactive decay. Detection of neutrons at transportation hubs in shipping containers or luggage can indicate the possible presence of smuggled nuclear materials or hidden nuclear weapons (WMDs). Practical, inexpensive solid state neutron detectors could have great application for Homeland Security, Antiterrorism, Nuclear Non-Proliferation applications, nuclear stockpile stewardship programs, nuclear power applications, Occupational Safety for any industry or research applications in which people work with or near fissionable material, nuclear reactors, or high energy accelerators, thermal neutron radiography, which is a powerful inspection/evaluation technique in industry and manufacturing, and they could even be fabricated into microminiaturized arrays to be used as detectors for high energy physics experiments among many other uses.

The need for neutron detectors has escalated in recent years. With the growing threat of terrorists trying to detonate a so-called dirty bomb containing radioactive material, improved devices for detecting plutonium from its neutron emissions are in great need.

Conventional neutron detectors employ high voltages in large gas-filled units. Neutron detection devices have been created using materials such as cadmium zinc telluride, however, neutron capture process produces high energy gamma rays which require the detectors to be large in order to detect the gamma rays efficiently.

Solid state neutron detectors could be mass produced with microfabrication techniques like those used in the semiconductor electronics industry. Additionally, they could be made inexpensive, miniaturized, portable, and operate on conventional low electronics voltages. Thus, they could greatly widen the practical applications for neutron detectors. One example is shown in U.S. Pat. No. 6,771,730 to Dowben, which is herein incorporated by reference in its entirety and can be modified to incorporate this invention.

Studies have shown that boron, with a high neutron capture cross-section should therefore be good for solid-state detectors if suitable semiconductor materials can be developed. Boron-based neutron detectors have been created using materials such as pyrolytic boron nitride (BN), boron phosphide (BP), boron carbide (B$_4$C). However, these materials have all formed relatively inefficient detectors. One example is shown in U.S. Pat. No. 6,771,730 to Dowben, which can be modified to incorporate this invention and is herein incorporated by reference in its entirety.

Prior attempts to develop a suitable detector material have either not worked at all, or had low sensitivity and suffered from the difficulties outlined above. Moreover, additional difficulties or complications encountered in the prior art include multiphase, rather than single phase material, great variability of properties, large lattice mismatch on Si substrates, a high lattice strain, rapid accumulation of radiation damage, or in the case of non-boron-based materials, a much lower neutron capture cross-section, large detector size, or stability problems They furthermore require the use of hazardous, toxic gasses either in the operation or fabrication of the materials. The materials of this invention show potential for improvement over the prior art because of these and other reasons.

Therefore, an improved icosahedral boride semiconducting material for neutron sensing applications and methods of use is desirable.

In light of the foregoing, the primary feature or advantage of the current invention is to provide an improved icosahedral boride semiconducting material for neutron sensing applications and methods of use.

Another feature or advantage of this invention is a material which possesses higher volumetric density of boron atoms than other boride-based neutron detector materials.

Another feature or advantage of the current invention is a material which can be easily made an n-type semiconducting boron-rich boride.

Another feature or advantage of the current invention is a material which can exhibit relatively high charge carrier mobility in either crystallized or amorphous form.

Another feature or advantage of the current invention is a material which is homogeneous, not multiphase, and in its amorphous form, does not possess grain boundaries.

Another feature or advantage of this invention is a material which, in its amorphous form, is more robust to radiation damage, more robust to the lithium by-products produced by nuclear reactions changing the doping, and easier to mass produce over the prior art.

A further feature or advantage of this invention is a material which, in its crystalline form, shows less lattice strain for growth on silicon (100) than other β-based materials.

Still another feature or advantage of this invention is a safer, non-toxic, more environmentally friendly method of fabrication than the prior art.

One or more of these or other features or advantages of the invention will be apparent from the specification and claims that follow.

BRIEF SUMMARY OF THE INVENTION

One or more of the foregoing features or advantages may be achieved by a device for neutron detecting comprising a control system for performing sensing algorithms, a closeable detection chamber, and a neutron detecting sensor within the chamber, wherein the sensor is constructed with a material having the general chemical formula $M1M2B_{14}$.

One or more of the foregoing may also be achieved by a semi-conducting material having the formula of $M1M2B_{14}$ wherein M1 is aluminum, magnesium, silver, sodium or scandium and M2 is boron, chromium, erbium, holmium, lithium, magnesium, thulium, titanium, yttrium, or gadolinium.

One or more of the foregoing features or advantages may also be achieved by a method of detecting neutrons comprising the steps of utilizing a sensor in the form of a p-n junction or heterojunction, at least one of the layers having the chemical properties of $M1M2B_{14}$ and measuring electrical voltage pulses produced when neutrons strike the detector, react with $^{10}B$ nuclei to produce energetic $^{7}Li$ and α particles, either or both of which then produce electron-hole pairs, which are separated by the internal built-in electric field of the p-n junction, thus producing electrical voltage pulses.

DETAILED DESCRIPTION OF A PREFERRED EMBODIMENT

Figure 1:
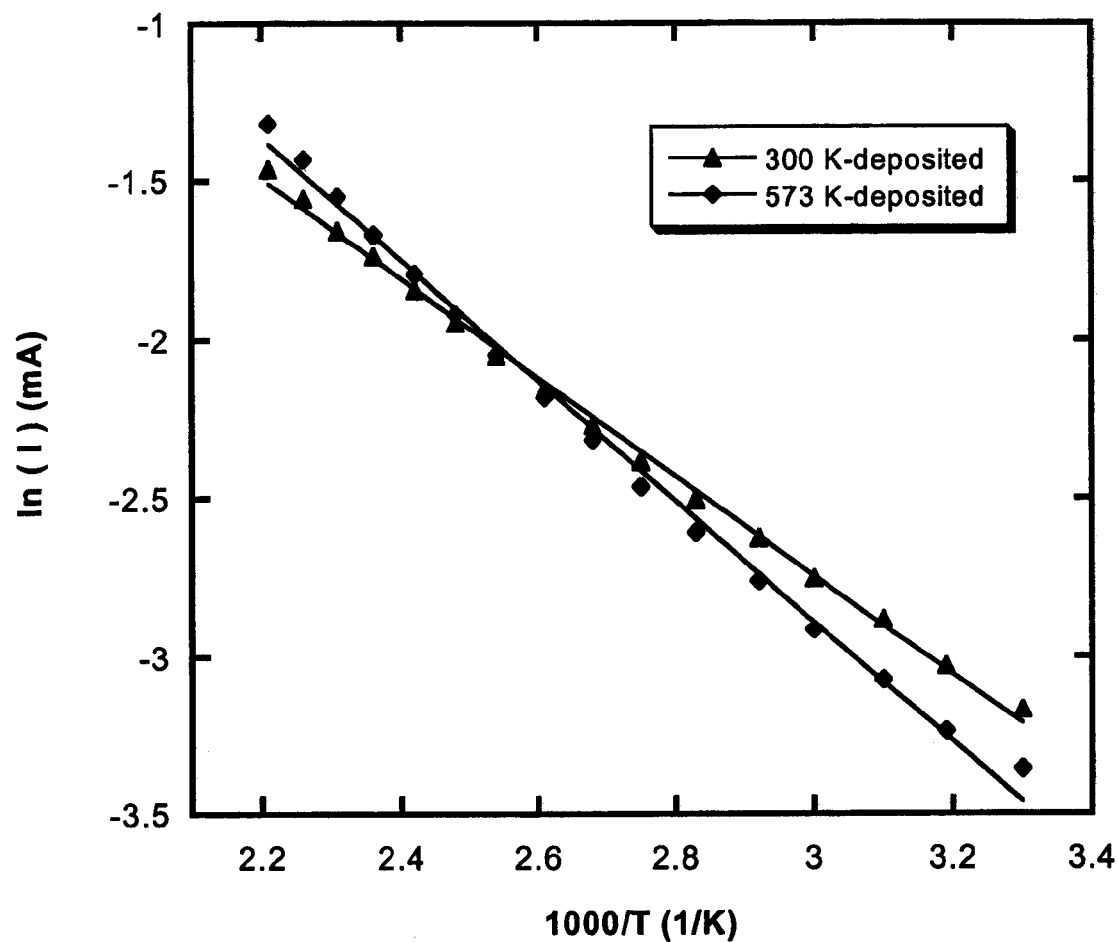
FIG. 1 shows ln I vs 1/T for the $AlMgB_{14}$ films.

This invention is for a material from which to make solid state neutron detectors, a neutron detector, and a method of using the same.

The $^{10}B$ in $AlMgB_{14}$, and more generally $M1M2B_{14}$, and related icosahedral boride semiconducting materials can capture a neutron, and through a nuclear reaction, produce an energetic $^{7}Li$ and an energetic alpha particle. Although the neutrons themselves have no charge, these energetic by-products of their reaction with $^{10}B$ atoms can be detected as electrical signals in various sorts of solid state devices. For example, in p-n junctions for which at least one of the layers is $M1M2B_{14}$, either or both of the energetic $^{7}Li$ and energetic alpha particle will create electron-hole pairs that will then be separated by the internal built-in electric field of the junction, causing an electrical voltage pulse, which can be measured through the use of an appropriate amplifier. These boride materials could be used simply as a detecting layer on top of a solid state detector of energetic charged particles. However, since these borides are themselves semiconductors, they can also be made into p-n heterojunctions with other semiconductors such as Si, SiC, etc., or made into all-boride p-n junctions. More complex semiconductor sensor structures can also be made. In addition, the material can be made much more sensitive by enriching with $^{10}B$ beyond the naturally occurring percentage of about 20%, although this would add considerable expense.

Our new $AlMgB_{14}$ and related icosahedral boride semiconducting materials can be applied in either their amorphous or crystalline form, and have many advantages relative to other materials that have been proposed or investigated for these applications as outlined later in this specification.

The invention is shown and discussed as $AlMgB_{14}$ for simplicity sake, however other known and predicted metal site atoms in orthorhombic $B_{12}$ compounds of the form $M1M2B_{14}$ are shown in Table 1.

TABLE 1

Summary of known and predicted metal site atoms in orthorhombic $B_{12}$ compounds of the form $M1M2B_{14}$.

| M1 | M2 | $\Sigma V_1$ | Occupancy M1, M2 |
|---|---|---|---|
| Mg | Mg | 4 | 0.93, 1.0 |
| Al | Mg | 5 | 0.75, 0.78 |
| Al | Li | 4 | 0.96, 1.0 |
| Al | Tm | 6 | 0.6, 0.52 |
| Al | Er | 6 | 0.73, 0.62 |
| Al | Y | 6 | 0.71, 0.62 |
| Al | Ho | 6 | 0.74, 0.63 |
| Al | Mg | 5 | 1.0, 0.5 |
| Na | B | 4 | |
| Al | Cr | 6 | |
| Al | Ti | 7 | |
| Al | Gd | 6 | |
| Ag | Cr | 4 | |
| Sc | Li | 4 | |

M1, M2: metal atom 1 & 2 in $(M1)(M2)B_{14}$;
V: electronic valence

Electrical Transport Properties in $M1M2B_{14}$ Film

The electrical transport properties of semiconducting $AlMgB_{14}$ films deposited at room temperature and 573 K are discussed below. The as-deposited films are amorphous, and they exhibit high n-type electrical conductivity, which is believed to stem from the conduction electrons donated by Al, Mg and/or Fe impurities in these films. The film deposited at 573 K is less conductive than the room temperature-deposited film. This is attributed to the nature of donor or trap states in the band gap related to the different deposition temperatures.

Boron-rich boride films are refractory semiconductors, which have been the subject of intense investigation in recent years due to their attractive properties, including high hardness (>30 GPa), high melting point (>2000° C.), low density, extremely low γ-radiation absorption, chemical inertness, and thermal stability at high temperatures. These materials may be useful in electronic devices operating in a wide variety of extreme or harsh environments (mechanically abrasive, radioactive, corrosive and/or high temperature). Successful implementation of these materials will require a thorough understanding of their electrical properties, which are profoundly influenced by their composition, microstructure and deposition methods. Considerable research has focused on the electrical transport mechanism, dielectric properties, doping behavior, and device performance of boron compounds with C, N, and O, such as $B_4C/B_5C$, $B_xN$ (x>1) and boron suboxide ($B_xO$, x>1). Recently, the ternary boride compound $AlMgB_{14}$ has attracted attention due to its interesting mechanical properties. $AlMgB_{14}$ films prepared by mechanical alloying are unusual in two regards when compared to other boron-rich boride films: they have an unusually low resistivity, and the charge carriers are predominantly n-type.

The AlMgB$_{14}$ films were prepared by pulsed laser deposition (PLD) from a hot-pressed Al$_{0.95}$Si$_{0.05}$MgB$_{14}$ target on thermally oxidized Si[100] at room temperature and 573 K respectively.

A common thread among all processing techniques for preparation of deposition targets is the reaction of constituent materials to form the desired chemistry (a.k.a. stoichiometry) followed by the consolidation of the product into a dense article. The approach most often employed for synthesis of AlMgB$_{14}$-based targets is a solid state technique known as mechanical alloying, followed by inert gas hot pressing of the resulting powders.

Two types of mechanical alloying devices are utilized: a vibratory mill for small quantities of powder and a planetary mill or attritor for larger amounts. Longer milling times are needed for the planetary mill to achieve the desired comminution of precursor materials size since collision energies are lower than those in most vibratory devices. Typical mass loads of 3 to 5 grams of powder were milled for 12 hours in a desktop vibratory mill within hardened tool steel vials, while 25 to 50 gram quantities per vial are milled using the planetary device, for times ranging from 50 to 100 hours. The mechanically alloyed powder is removed from the vials and consolidated by hot pressing under either vacuum or inert gas environment at temperatures ranging from 1623 K to 1773 K in graphite dies. Densities on the order of 95 to 98 percent of theoretical density are typically obtained in 0.5" to 1" diameter hot pressed targets. Larger targets can be produced by hot isostatically pressing the mechanically alloyed powder in graphite-lined, Ta crucibles. The crucibles are welded shut under vacuum with an electron beam welder and the sealed powder is exposed to hydrostatic pressures of 30 to 50 ksi.

Alternatively, the target can be produced by blending the constituent powders prior to consolidation. Limited experimental work has been performed in this area, however, formation of the desired compound has been achieved by hot pressing blended aluminum, magnesium, and boron powders in the proper mass ratios. Typical density of pressed and sintered compacts is only 80 to 85 percent of theoretical density.

The structure of the baseline target material is characterized as a homogeneous assemblage of sub-micron AlMgB$_{14}$ grains. Some variations of the target composition include the existence of additional phases such as TiB$_2$, which act to strengthen the matrix by blunting cracks and limiting the extent to which other defects (such as dislocations) can propagate. In addition, various minor impurity phases such as spinel (MgAl$_2$O$_4$) may also be present. These impurity phases typically result from non-ideal processing conditions and are generally deleterious for applications requiring hardness and wear resistance. The presence of impurity phases is usually unavoidable in most industrial-scale processing environments.

The target is typically obtained by applying a combination of high temperature and high pressure to powders of the desired composition. The application of pressure and temperature can occur simultaneously (as in hot pressing or hot isostatic pressing) or sequentially (as in pressing and sintering). The sequential route may require the addition of a sintering aid to facilitate densification of the powders. Ideally, the amount of porosity in the target should be low, preferably less than 5% by volume. Porosity can lead to non-uniform ejection of material into the deposition plume. These clusters or aggregates of material can remain intact during transit from the target to the substrate, resulting in point-to-point variations in the film.

The Pulsed Laser Deposition (PLD) process is a thin film deposition technique in which a solid source target material is ablated by a high-energy laser and then condensed on a heated substrate. Typically, UV laser pulses are focussed through a quartz window into a vacuum chamber containing the target material. The pulses strike a rotating, off-center target at a 45° angle to the surface creating a plume of highly energetic target species. The plume extends outward from the ablation point in a cone nearly normal to the surface and deposits on a nearby substrate. The substrate material is placed parallel to the target, a few centimeters away, such that the center plume impinges the center of the substrate. Because the high-energy ablation process is carried out under non-equilibrium conditions, the stoichiometry of the target material is almost exactly reproduced in the deposited thin film, with no losses due to volatility differences between that target constituent elements. It is important to understand the difference between this process and thermal evaporation. In the high-energy ablation process, the intense pulse of laser radiation breaks bonds in the target, and sends the material out in the plume towards the substrate mostly as individual atoms. Thus PLD is a useful deposition method even for very high melting point materials like AlMgB$_{14}$ and related icosahedral boride semiconducting materials.

Sputter deposition is another set of methods of thin film deposition that can be useful in fabricating thin films of M1M2B$_{14}$ icosahedral boride thin films and multilayer structures for neutron sensing applications. In the basic method of sputtering, the M1M2B$_{14}$ material is fabricated into a target as outlined above, then installed in a vacuum system. The target is then bombarded by energetic ions (usually inert gas ions, commonly Ar$^+$, with energies typically in the order of magnitude of $10^2$ or $10^3$ Volts). The ions knock atoms out of the target in a kinetic process (like the break in billiards), which accumulate on the surface on which one wants to grow a film, the substrate typically being parallel to the target. There are several different schemes with which one can produce the energetic ions and ion bombardment of the target: In diode sputtering the target forms one electrode, and the substrate sits on top of the other electrode of the system. The vacuum chamber is back-filled with the inert working gas, and potential applied across the 2 electrodes. Although d.c. diode sputtering is possible, it is not common. Diode sputtering is most often performed with r.f. potential (with the rest of the metallic vacuum chamber grounded, to give unequal electrode areas). With r.f. potential, semiconductors and insulators can be sputtered, in addition to conductors. This method would be useful for fabricating M1M2B$_{14}$. Magnetron sputtering is similar, but a configuration of permanent magnets behind the target confines the plasma in front of the target, giving higher density plasma, sputtering with lower potential, cooler substrate temperature, and less unintended bombardment of the substrate. This method can be employed with either d.c. or r.f. potential. The latter would probably be more useful for M1M2B$_{14}$, although resistivity might be low enough to employ the former. In ion beam sputtering, plasma is made in a separate, ion gun (either by filaments or by r.f. excitation), then through the use of biased grids, collected and accelerated towards the target. Typically, there is also an electron source associated with the gun, to provide a neutralized beam, so nothing in the system charges up with ions, and so that one can sputter semiconductors or insulators. Since sputtering uses energetic ions to remove atoms from the target and deposit onto the substrate, this process is useful for depositing high-melting point materials like M1M2B$_{14}$ icosahedral borides.

Since sputtering is a scalable technology, it is amenable for industrial manufacturing of the devices.

For example, to produce the AlMgB$_{14}$ sample films for electronic property measurements, the PLD process employed the 248 nm wavelength of a Kr-F UV Excimer laser. The beam was pulsed at 10 Hz with a pulse duration, or width, of 25 to 50 nsec. To avoid particulate generation, a fairly low energy of 100 mJ per pulse was selected. The beam emerging from the laser was optically focused, with a 100 cm focal length quartz condensing lens, to an oval ablation point of ~0.02 cm$^2$ yielding a surface energy density of 5.0 J/cm$^2$, per pulse. The silicate glass or Si/SiO$_2$ substrate was mounted on a substrate holder on which depositions with substrate temperature below 50° C. could be performed, or the substrate could be heated, as desired. A background vacuum level in the deposition chamber of ~6.0×10$^{-7}$ was established prior to beginning the deposition. Depositions were carried out for 2-4 hours producing films with thickness under 5000 Å.

The composition of AlMgB$_{14}$ films was determined by x-ray photoelectron spectroscopy (XPS). The electrical resistivity of AlMgB$_{14}$ films was measured at room temperature using the four-point probe and van der Pauw method. In addition, van der Pauw Hall measurements were carried out on AlMgB$_{14}$ films to determine the carrier type, carrier concentration, and Hall mobility. The contacts were formed with Ag paint, and exhibited ohmic characteristics after a 5 hour-baking at 100° C., as indicated by room temperature I-V measurements. A hot probe method was also employed to determine the carrier type in AlMgB$_{14}$ films. The dark current I, at a constant voltage of 5 V, was recorded as a function of temperature T from 300 K to 453 K, with Al stripes made by thermal evaporation as contacts. The optical absorption spectra of the films grown on Corning 7059 glass were measured by a Perkin-Elmer UV-VIS-NIR spectrophotometer. The optical band gaps were determined by fitting the optical absorption spectra to the Tauc equation.

PLD is considered a viable means of transferring target stoichiometry to thin films, and this has been confirmed by XPS analysis in the case of AlMgB$_{14}$ films. However, XPS measurements also indicated the presence of O and Fe in the films. XPS also indicated that there is no appreciable difference in composition between room temperature and 573 K-deposited AlMgB$_{14}$ films. The microstructure of AlMgB$_{14}$ films, which was examined by transmission electron microscopy, remains amorphous regardless of substrate temperature, and no evidence of conducting inhomogeneities or crystalline domains was observed.

The electrical properties of AlMgB$_{14}$ films obtained through PLD of mechanically alloyed and hot pressed targets are summarized in Table 2.

TABLE 2

The electrical properties of as-deposited Si-doped AlMgB$_{14}$ films.

| Deposition temperature | Resistivity (Ω-cm) (four-point probe) | Resistivity (Ω-cm) (van der Pauw) | Carrier type | Carrier concentration (cm$^{-3}$) | Carrier mobility (cm$^2$/Vs) |
|---|---|---|---|---|---|
| 300 K | 4.4 | 4.5 | n | 2.85 × 10$^{17}$ | 4.86 |
| 573 K | 38.2 | 41.1 | n | 2.06 × 10$^{16}$ | 6.89 |

Compared with the electrical resistivity of other boron-rich boride films, which typically cover a wide range of values from ~10$^3$ to 10$^9$ Ω-cm, the electrical resistivity of room temperature and 573 K-deposited AlMgB$_{14}$ films is approximately three to eight orders of magnitude lower, approaching that of single crystal boron carbide. Such low resistivity is particularly noteworthy since the films exhibit no long-range crystallinity. Furthermore, the charge carriers in these AlMgB$_{14}$ films are dominated by electrons, as opposed to the holes which prevail in most boron-rich boride materials.

The presence of iron, a consequence of the mechanical processing technique employed in the processing of these materials, alters the electrical behavior of the films compared with that of chemically pure AlMgB$_{14}$. Initial characterization of electrical resistivity and carrier mobility, as summarized in Table 2, involved thin films of AlMgB$_{14}$ obtained by pulsed laser deposition from hot pressed targets containing approximately 10% by weight of iron. In order to reduce the amount of iron, an alternative processing technique was attempted, which resulted in PLD targets containing from 1 to 2% iron.

Hall effect characterization of these films gave the following results:
Electrical resistivity at 300K: 7413 milliOhm-cm
Carrier mobility: 4.5 cm$^2$/V-s
Carrier concentration: 3.9×10$^{17}$ per cm$^3$
Carrier type: electron The significance of this finding is two-fold. First, a high carrier mobility can be obtained in amorphous films, without the need for a subsequent crystallization heat treatment. The efficiency of a solid state device is directly proportional to the ease with which its charge carriers can propagate through the material, i.e., carrier mobility. Since the carrier mobility of most borides is on the order of 1 to 3 cm$^2$/V-s, the AlMgB$_{14}$-based detectors are expected to offer improved efficiency. Moreover, since the pure material is intrinsically p-type, it is seen that introduction of iron can change the conduction mechanism to n-type, thereby producing the necessary materials for a p-n junction, a necessary solid state detection device.

The low electrical resistivity observed in AlMgB$_{14}$ films is clearly a consequence of a high carrier concentration combined with moderate carrier mobility. In general, the electronic structure of all boron-rich boride materials is essentially determined by the B$_{12}$ icosahedra. The valence band of these materials typically consists of an upper split-off subband VB$_1$, which is generated by the Jahn-Teller distortion of the B$_{12}$ icosahedra, and a lower subband VB$_2$. VB$_1$ is partially occupied by electrons in low-density localized states; these electrons are thermally excited from VB$_2$ with free holes left behind, thus VB$_1$ acts like an intrinsic acceptor level in nature. Accordingly, two transport mechanisms are operative: electron hopping at the Fermi level in VB$_1$ and free hole conduction in the extended states of VB$_2$. Moreover, strong electron-phonon coupling in B$_{12}$ icosahedra leads to the formation of six intrinsic high-density trap levels within the band gap. For most boron-rich boride materials, electrical transport by holes predominates because the excited electrons can be easily captured in the trap states.

Neither electron hopping nor band conduction by holes can reasonably explain the unique transport behavior of the AlMgB$_{14}$ films. The significantly enhanced n-type carrier mobility observed in the films (4.86 and 6.89 cm$^2$/Vs) suggests that it is the electrons, which are excited beyond the mobility edge into extended states of the conduction band, that play a key role in the transport process of AlMgB$_{14}$ films. Moreover, the high carrier concentration (10$^{16}$-10$^{17}$ cm$^{-3}$) suggests that these electrons are provided by metallic dopants in AlMgB$_{14}$ films, because pure boron films typically have far lower p-type carrier concentrations (~10$^{13}$ cm$^{-3}$). There are two pathways to introduce dopants into the boron-rich boride materials: substitution and network modification. The latter has been shown to occur with metallic dopants like Fe and Ni in boron carbide. By network modification, metallic dopants simply fill the voids or interstitial positions in the B$_{12}$ icosahedral network, and contribute their valence electrons to B$_{12}$ icosahedra through charge transfer. The Al and Mg probably follow a similar mechanism in AlMgB$_{14}$ films as well. Fe impurities may also act as donors in these films, just as they do in boron carbide and β-rhombohedral boron.

Figure 2:
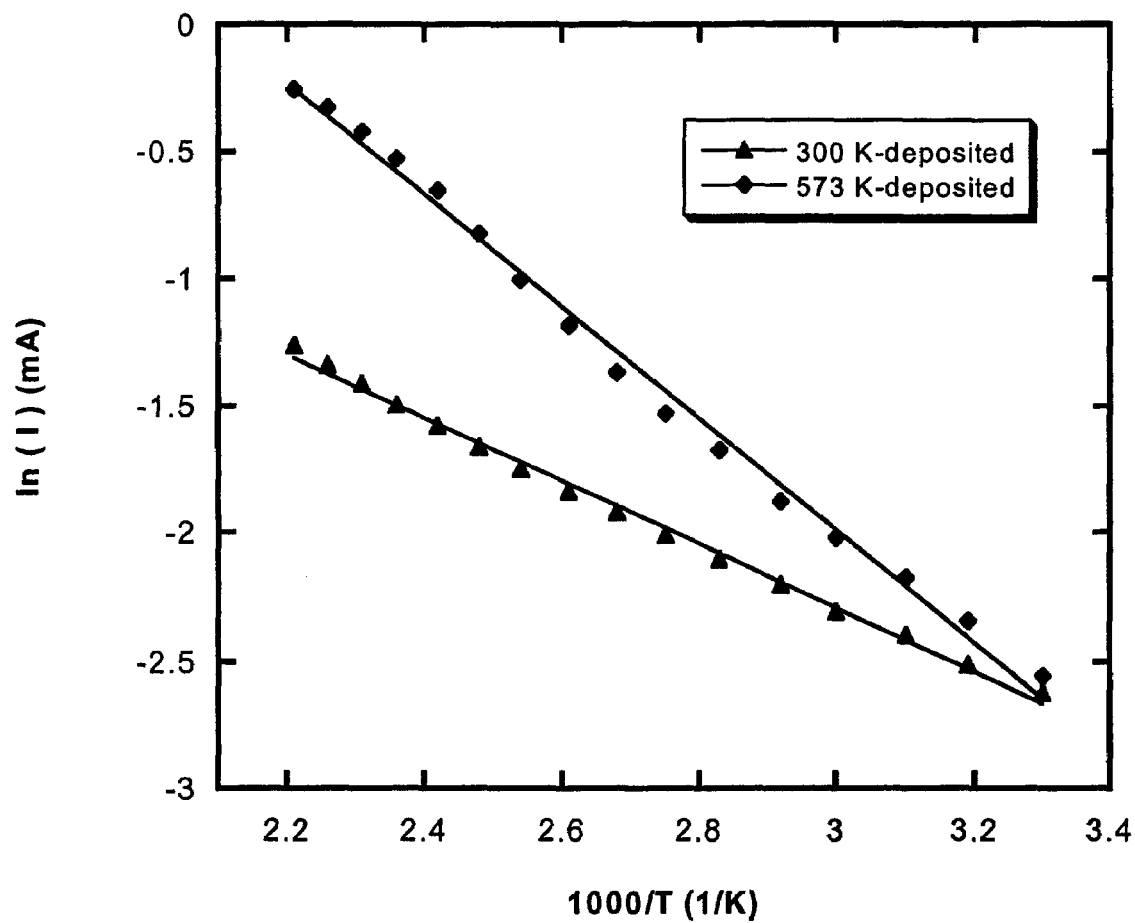
FIG. 2 shows ln I vs 1/T for baseline $AlMgB_{14}$ films, without Si.

FIG. 1 shows ln I vs 1/T for the AlMgB$_{14}$ films. A well-defined linear behavior is evident, which is somewhat unusual given an amorphous semiconductor with complex composition, as such a "clean" doping behavior suggests that a single donor level is providing the conduction electrons. The activation energies are 0.13 eV for the room temperature-deposited AlMgB$_{14}$ film and 0.17 eV for the 573 K-deposited AlMgB$_{14}$ film, indicating that the Al, Mg and/or Fe introduce a donor level below the conduction band edge. Due to the presence of minor amounts of Si (<1 at. %) in these films, the likelihood that Si is also a donor must be considered. FIG. 2 shows ln I vs 1/T for baseline AlMgB$_{14}$ films without Si. The activation energies are 0.11 eV for the room temperature-deposited film and 0.19 eV for the 573 K-deposited film, suggesting that Si, however, does not have any impact on the transport properties of AlMgB$_{14}$ films, at least not to the extent that the metallic atoms do.

Figure 3:
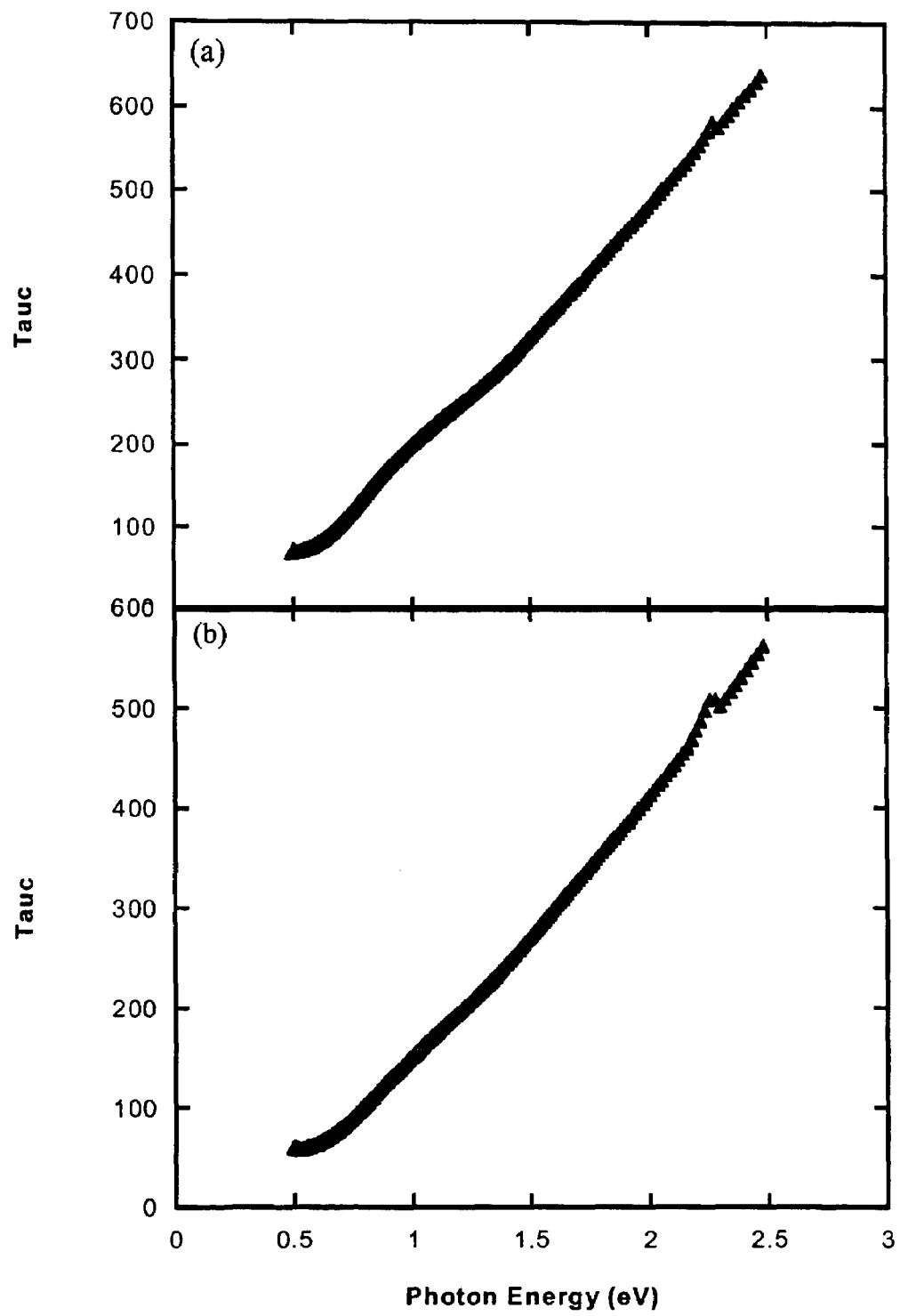
FIG. 3 shows the Tauc plots of $AlMgB_{14}$ films.

Transformation of intrinsically p-type boron-rich boride materials to n-type by doping is not a trivial task because of the difficulty in overcompensating the high-density trap states in the band gap; an extremely high donor concentration, on the order of ~10$^{20}$ cm$^{-3}$, is generally required to enable this transformation. However, n-type carriers can be obtained in AlMgB$_{14}$ films at much lower donor concentrations. This is probably because the six intrinsic trap states, which basically depend on the vibrational modes of B$_{12}$ icosahedra, were not fully developed at the low deposition temperatures. FIG. 3 shows the Tauc plots of AlMgB$_{14}$ films, from which the optical band gaps are determined to be ~0.5 eV, and it appears that the deposition temperature does not have a strong effect on the optical gaps. Therefore, the different carrier concentrations in AlMgB$_{14}$ films can only be attributed to the trap states of different characters, i.e., an increase in deposition temperature leads to a higher density of well-formed B$_{12}$ icosahedra, which, in turn, gives rise to more electron trap states in the gap. As the density of these trap states increases, a decrease in carrier concentration was expected, and was indeed observed.

In summary of the electrical characteristics of amorphous AlMgB$_{14}$ films produced by PLD show an unusually low resistivity. The high n-type carrier mobility demonstrates that the electrical transport is due mainly to band conduction by electrons, which are contributed by Al, Mg and/or Fe donor states. The electrical properties of AlMgB$_{14}$ films are affected by the deposition temperature in such a manner that higher deposition temperatures tend to favor development of trap states in the band gap, hence resulting in a lower carrier concentration.

AlMgB$_{14}$ and related icosahedral borides of the form M1M2B$_{14}$ possesses a higher volumetric density of B atoms than other boride-based neutron detector materials: B$_4$C, BP, h-BN, BAs, and α-B. Boron density values are summarized in Table 3:

TABLE 3

| Composition | Boron Density (# atoms/cm$^3$ × 10$^{22}$) |
|---|---|
| AlMgB$_{14}$ | 11.4 |
| B$_4$C | 3.6 |
| BP | 1.8 |
| h-BN | 5.5 |
| BAs | 7.3 |
| α-boron | 0.5 |

The materials of this invention can be easily made an n-type semiconducting boron-rich boride (most other boron-rich borides tend to be p-type). This could enable all-boride p-n junctions or other sensor devices. In addition, n-type material should be much more robust to the Li produced in the detecting reactions changing the doping of the material. Material of the M1M2B$_{14}$ and related compositions already has a sizeable amount of metal atoms present, so changing a certain percentage of B to Li in the detecting reactions should have less effect, and properties should change only very slowly over the lifetime of the materials exposed to neutron flux. In fact, closely related materials that might be employed are Li-containing M1M2B$_{14}$, such as LiAlB$_{14}$ and Gd-containing M1M2B$_{14}$ such as AlGdB$_{14}$.

The materials of this invention can show relatively high charge carrier mobility even as amorphous material; 1 to 3 cm2/V–s, which is comparable to the accepted value of crystalline β-boron. It could either be applied as amorphous material, or crystallized with possibly even higher mobility.

The materials of this invention are homogenous, not multiphase as is much of the prior art. Furthermore, in its amorphous form, it does not have grain boundaries.

The materials of this invention can be applied as amorphous material, whereas the prior art generally refers to crystalline material. For neutron sensing applications, an amorphous material has the following advantages, provided the carrier mobility is not too low:

a) Amorphous network structure could be much more robust to radiation damage;
b) Could be much more robust to the Li produced by the nuclear reactions changing the doping; and
c) Could be easier to mass-produce devices than single crystal.

For application as crystalline films, AlMgB$_{14}$ shows less lattice strain for growth on Si(100) than other B-based materials except B$_4$C, which has the disadvantages that it is very difficult to grow single phase and shows great variability of properties, possibly due to problems with free carbon in the films. The minimum lattice strain values for various crystalline boride-based solid state neutron detector materials on silicon[100], assuming the most favorable orientation, are listed in the following table:

TABLE 4

| Material | δ |
|---|---|
| 1 B$_4$C | 0.04 |
| 2 BP | 0.16 |
| 3 h-BN | 0.18 |
| 4 BAs | 0.12 |
| 5 α-boron | 0.10 |
| 6 AlMgB$_{14}$* | 0.07 |

*assuming an [001] texture in the film which has been confirmed in experimental trials.

The materials of this invention can be produced by pulsed laser deposition (PLD) or by sputtering, rather than chemical vapor deposition (CVD) or plasma enhanced chemical vapor deposition (PECVD) as is most of the prior art. PLD or sputtering do not require the use of toxic precursor gasses as does CVD or PECVD, thus creating a safer, non-toxic, more environmentally friendly method of manufacture for the desired material.

Other advantages of the material of this invention versus competing neutron sensor materials are summarized as follows:

Boron-containing materials:
  Boron-carbide CVD thin film—multiphase, polycrystalline films (undesirable secondary phases and grain boundaries can degrade sensing and transport properties)—thought to be very difficult to grow single phase. Great variability of properties, possible problems with free carbon in the films.
  BP CVD thin film—has a large lattice mismatch with Si, and layers were reported to be highly strained. Samples were polycrystalline and charge transport properties were unfavorable. Did not work as detector material. BP heterojunction diodes with Si failed to work as neutron detectors.
  BAs CVD—has a large lattice mismatch with Si, and layers were reported to be highly strained. Samples were polycrystalline and charge transport properties were unfavorable. Did not work as detector material.
  BN bulk material—accumulated radiation damage very quickly, and prototype device design required an excessively high operating voltage (~900 V.)

Materials based on other elements besides B:
  Li has a much lower neutron capture cross-section (940 barns compared to 3835 barns for $^{10}$B).
  Cd has a large neutron capture cross section, but to use this effect for a sensor requires detecting the resulting very high energy γ-rays, which requires very large detectors. Thus Cd-based materials do not appear to be a practical choice.
  Gd-based detectors are likely to have stability problems.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A device for neutron detection comprising:
    a control system for performing sensing algorithms;
    a closable detection chamber; and
    a neutron detecting sensor within the chamber wherein the sensor is constructed with a material having the chemical properties of $M1M2B_{14}$, wherein M1 is selected from the group consisting of aluminum, magnesium, silver, sodium, and scandium and M2 is selected from the group consisting of boron, chromium, erbium, holmium, lithium, magnesium, thulium, titanium, yttrium, and gadolinium.

2. The device of claim 1 wherein the sensor is in the form of a film.

3. The device of claim 2 wherein the film is grown by a process selected from PLD or by sputtering.

4. The device of claim 1 wherein the sensor has a reduced level of iron impurity.

5. The device of claim 4 wherein the iron impurity level is from 1% by weight to 2% by weight.

6. The device of claim 1 wherein the material is made of amorphous $M1M2B_{14}$.

7. In a neutron detector having a neutron detection sensor, the improvement comprising:
    having a sensor constructed with a material having a chemical formula $M1M2B_{14}$, wherein M1 is selected from the group consisting of aluminum, magnesium, silver, sodium, and scandium, and M2 is selected from the group consisting of boron, chromium, erbium, holmium, lithium, magnesium, thulium, titanium, yttrium, and gadolinium.

8. A method of detecting neutrons comprising the steps of:
    utilizing a sensor in the form of a p-n junction or heterojunction having layers, at least one of the layers having the chemical properties of $M1M2B_{14}$, wherein M1 is selected from the group consisting of aluminum, magnesium, silver, sodium, and scandium, and M2 is selected from the group consisting of boron, chromium, erbium, holmium, lithium, magnesium, thulium, titanium, yttrium, and gadolinium; and
    measuring electrical voltage pulses produced when neutrons strike the sensor, react with $^{10}$B nuclei to produce energetic $^{7}$Li and α particles, either or both of which then produce electron-hole pairs, which are separated by the internal built-in electric field of the p-n junction to producing electrical voltage pulses.

9. The method of claim 8 wherein the sensor is a thin film sensor.

10. The method of claim 9 wherein the sensor is a thin film sensor with from 1% to 2% iron impurity.

11. The method of claim 9 wherein the thin film sensor is produced by PLD.

* * * * *